US012676345B2

(12) United States Patent
Park et al.

(10) Patent No.: US 12,676,345 B2
(45) Date of Patent: Jul. 7, 2026

(54) BATTERY APPARATUS, BATTERY MANAGEMENT SYSTEM AND PRECHARGING METHOD

(71) Applicant: LG Energy Solution, Ltd., Seoul (KR)

(72) Inventors: Hangon Park, Daejeon (KR); Kihoon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 548 days.

(21) Appl. No.: 18/033,008

(22) PCT Filed: Jul. 7, 2022

(86) PCT No.: PCT/KR2022/009877
§ 371 (c)(1),
(2) Date: Apr. 20, 2023

(87) PCT Pub. No.: WO2023/287112
PCT Pub. Date: Jan. 19, 2023

(65) Prior Publication Data
US 2023/0402660 A1      Dec. 14, 2023

(30) Foreign Application Priority Data

Jul. 14, 2021      (KR) ........................ 10-2021-0092481

(51) Int. Cl.
*H01M 10/42*          (2006.01)
*B60L 3/00*          (2019.01)
(52) U.S. Cl.
CPC ......... *H01M 10/425* (2013.01); *B60L 3/0046* (2013.01); *H01M 2010/4271* (2013.01)
(58) Field of Classification Search
CPC ................................................. H01M 10/425
See application file for complete search history.

(56) References Cited

U.S. PATENT DOCUMENTS

2011/0210746 A1      9/2011   Yugou et al.
2012/0139493 A1*     6/2012   Sakurai ................. H02J 7/0016
                                                            320/118
(Continued)

FOREIGN PATENT DOCUMENTS

CN          102166959 A          8/2011
CN          104160585 A          11/2014
(Continued)

OTHER PUBLICATIONS

Extended European Search Report including Written Opinion for Application No. 22842374.5 dated Mar. 28, 2024, pp. 1-10.
(Continued)

*Primary Examiner* — Olatunji A Godo
(74) *Attorney, Agent, or Firm* — Lerner David LLP

(57)          ABSTRACT

In a battery apparatus, a first precharge switch is connected between a terminal of a first battery pack and a capacitor of an external apparatus, and a second precharge switch is connected between a terminal of a second battery pack and the capacitor. A first precharge control circuit controls an operation of the first precharge switch based on a difference between a voltage of the first battery pack and a voltage of the capacitor, and a second precharge control circuit controls an operation of the second precharge switch based on a difference between a voltage of the second battery pack and the voltage of the capacitor. A processor transfers a first control signal for controlling the first precharge switch to the first precharge control circuit, and transfers a second control signal for controlling the second precharge switch to the second precharge control circuit.

15 Claims, 4 Drawing Sheets

(56) References Cited

U.S. PATENT DOCUMENTS

| | | | |
|---|---|---|---|
| 2012/0274143 A1 | 11/2012 | Arakawa et al. | |
| 2013/0175857 A1 | 7/2013 | Shreevani et al. | |
| 2014/0300180 A1 | 10/2014 | Iwashita et al. | |
| 2015/0219720 A1 | 8/2015 | Huh | |
| 2017/0166065 A1 | 6/2017 | Hong et al. | |
| 2020/0274385 A1 | 8/2020 | Saito | |
| 2020/0412155 A1* | 12/2020 | Choi | H02J 7/007182 |
| 2022/0149635 A1* | 5/2022 | Ryu | H01M 50/204 |

FOREIGN PATENT DOCUMENTS

| | | | |
|---|---|---|---|
| CN | 111819756 | A | 10/2020 |
| JP | H10014104 | A | 1/1998 |
| JP | 2003102101 | A | 4/2003 |
| JP | 2010051082 | A | 3/2010 |
| JP | 2012182984 | A | 9/2012 |
| JP | 5286456 | B1 | 9/2013 |
| JP | 5298158 | B2 | 9/2013 |
| JP | 2014204656 | A | 10/2014 |
| JP | 2018082596 | A | 5/2018 |
| JP | 2019164897 | A | 9/2019 |
| JP | 2020137334 | A | 8/2020 |
| JP | 2021515510 | A | 6/2021 |
| JP | 6901989 | B2 | 7/2021 |
| KR | 101265010 | B1 | 5/2013 |
| KR | 20140072522 | A | 6/2014 |
| KR | 20150083739 | A | 7/2015 |
| KR | 102044737 | B1 | 11/2019 |
| KR | 20190128281 | A | 11/2019 |
| KR | 20200058995 | A | 5/2020 |

OTHER PUBLICATIONS

Search report from International Application No. PCT/KR2022/009877, mailed Nov. 2, 2022.

* cited by examiner

BATTERY APPARATUS, BATTERY MANAGEMENT SYSTEM AND PRECHARGING METHOD

CROSS-REFERENCE TO RELATED APPLICATION

This application is a national phase entry under 35 U.S.C. § 371 of International Application No. PCT/KR2022/009877 filed Jul. 7, 2022, which claims priority from Korean Patent Application No. 10-2021-0092481 filed on Jul. 14, 2021, all of which are incorporated herein by reference.

TECHNICAL FIELD

The described technology relates to a battery apparatus, a battery management system, and a precharge method.

BACKGROUND ART

An electric vehicle is a vehicle that obtains power by driving a motor mainly using a battery as a power supply. The electric vehicles are being actively researched because they are alternatives that can solve pollution and energy problems of internal combustion vehicles. Rechargeable batteries are used in various external apparatuses other than the electric vehicles.

Recently, as a battery having a high output and a large capacity is required, a battery apparatus in which a plurality of battery packs are connected in parallel is used. A switching circuit for a connection control of the battery pack may be used for each battery pack. A precharge circuit is used for each switching circuit in order to prevent a rush current generated at the beginning of driving by the switching circuit. The precharge circuit can prevent the inrush current by precharging a capacitor connected to an inverter of an external device through a precharge resistor at the beginning of driving. An overcurrent that may occur at the beginning of driving frequently flows through the precharge resistor. When the overcurrent frequently flows through the precharge resistor, a cycle-life of the precharge circuit may be reduced.

DISCLOSURE

Technical Problem

Some embodiments may provide a battery apparatus, a battery management system, and a precharge method for extending a cycle-life of a precharge circuit.

Technical Solution

According to an embodiment, a battery apparatus including a first battery pack and a second battery pack that are connected in parallel, a first precharge switch, a second precharge switch, a first precharge control circuit, a second precharge control circuit, and a processor may be provided. The first precharge switch may be connected between a terminal of the first battery pack and a capacitor of an external apparatus, and the second precharge switch may be connected between a terminal of the second battery pack and the capacitor of the external apparatus. The first precharge control circuit may control an operation of the first precharge switch based on a difference between a voltage of the first battery pack and a voltage of the capacitor of the external apparatus, and the second precharge control circuit may control an operation of the second precharge switch based on a difference between a voltage of the second battery pack and the voltage of the capacitor of the external apparatus. The processor may send a first control signal for controlling the first precharge switch to the first precharge control circuit, and send a second control signal for controlling the second precharge switch to the second precharge control circuit.

In some embodiments, the first precharge control circuit may be configured to close the first precharge switch in response to receiving the first control signal having an enable level from the processor and the difference between the voltage of the first battery pack and the voltage of the capacitor being greater than a predetermined voltage.

In some embodiments, the first precharge control circuit may be configured to maintain an open state of the first precharge switch in response to receiving the first control signal having an enable level from the processors and the difference between the voltage of the first battery pack and the voltage of the capacitor being less than or equal to a predetermined voltage.

In some embodiments, the predetermined voltage may be 0V.

In some embodiments, the first precharge control circuit may include a comparator configured to compare the voltage of the first battery pack with the voltage of the capacitor of the external apparatus, and a logic circuit that performs a logical operation to output a third control signal according to a comparison result of the comparator and the first control signal, and the first precharge control circuit may be configured to control the first precharge switch based on the third control signal.

In some embodiments, the first precharge control circuit may include a comparator that compares the voltage of the first battery pack with the voltage of the capacitor of the external apparatus, a logic circuit that performs a logical operation to output a third control signal according to a comparison result of the comparator and the first control signal, and a delay circuit configured to output a fourth control signal by delaying the third control signal, and the first precharge control circuit may be configured to control the first precharge switch based on the fourth control signal.

In some embodiments, when the voltage of the second battery pack is higher than the voltage of the first battery pack, the processor may be configured to output the second control signal having an enable level, and output the first control signal having the enable level when a difference between the voltage of the second battery pack and the voltage of the first battery pack is less than or equal to a predetermined voltage.

In some embodiments, the battery apparatus may further include a first precharge resistor through which a first current flows from the first battery pack to the capacitor of the external apparatus when the first precharge switch is closed, and a second precharge resistor through which a second current flows from the second battery pack to the capacitor of the external apparatus when the second precharge switch is closed.

According to another embodiment, a battery management system of a battery apparatus including a battery pack may be provided. The battery management system may include a precharge switch, a processor, and a precharge control circuit. The precharge switch may be connected between a terminal of the battery pack and a capacitor of an external apparatus, and the processor may output a first control signal for controlling the precharge switch. The precharge control circuit may receive the first control signal, close the precharge switch when the first control signal is received and a difference between a voltage of the battery pack and a voltage of the capacitor of the external apparatus is greater than a predetermined voltage, and maintain an open state of the precharge switch when the difference between the voltage of the battery pack and the voltage of the capacitor of the external apparatus is less than or equal to the predetermined voltage.

In some embodiments, the precharge control circuit may include a comparator configured to compare the voltage of the battery pack and the voltage of the capacitor of the external apparatus, and a logic circuit that performs a logical operation to output a second control signal based on a comparison result of the comparator and the first control signal, and the precharge control circuit may be configured to control the precharge switch based on the second control signal.

In some embodiments, the precharge control circuit may include a comparator configured to compare the voltage of the battery pack and the voltage of the capacitor of the external apparatus, a logic circuit configured to perform a logical operation to output a second signal based on a comparison result of the comparator and the first control signal, and a delay circuit that outputs a third control signal by delaying the second control signal, and may control the precharge switch based on the second control signal.

In some embodiments, the battery management system may further include a precharge resistor through which a current flows from the battery pack to the capacitor of the external apparatus when the precharge switch is closed.

According to yet another embodiment, a method of precharging a capacitor of an external apparatus connected to a battery apparatus including a battery pack may be provided. The method may include closing a negative switch of the battery pack, precharging the capacitor of the external apparatus based on a difference between a voltage of the battery pack and a voltage of the capacitor of the external apparatus, closing a precharge switch when the precharging the capacitor of the external apparatus is necessary, maintaining the precharge switch in an open state when the precharging the capacitor of the external apparatus is not necessary, and closing a positive switch of the battery pack.

In some embodiments, the method includes precharging the capacitor of the external apparatus when the difference between the voltage of the battery pack and the voltage of the capacitor of the external apparatus is less than or equal to a predetermined voltage.

In some embodiments, the method also includes not precharging the capacitor of the external apparatus when the difference between the voltage of the battery pack and the voltage of the capacitor of the external apparatus is greater than a predetermined voltage.

Advantageous Effects

According to an embodiment, when a sufficient voltage is charged in the capacitor and thus precharging is unnecessary, precharging is not performed regardless of the control signal, and thus unnecessary precharging process can be omitted.

DETAILED DESCRIPTION

Figure 1:
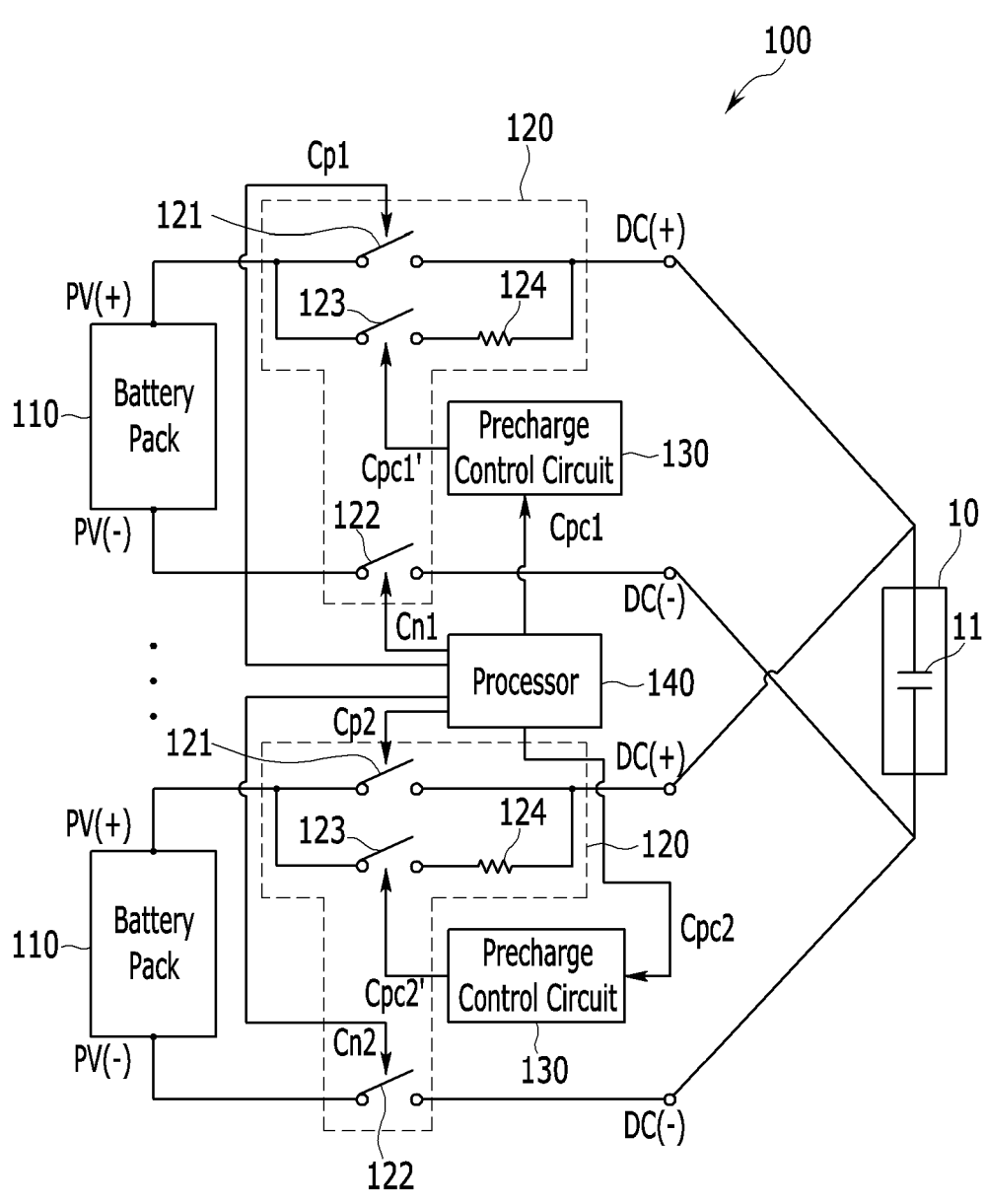
FIG. 1 is a diagram showing an example of a battery apparatus according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is "connected" to another element, it should be understood that the element may be directly connected to the other element or connected to the other element through a third element. On the other hand, when it is described that an element is "directly connected" to another element, it should be understood that the element is connected to the other element through no third element.

As used herein, a singular form may be intended to include a plural form as well, unless the explicit expression such as "one" or "single" is used.

In flowcharts described with reference to the drawings, the order of operations or steps may be changed, several operations or steps may be merged, a certain operation or step may be divided, and a specific operation or step may not be performed.

FIG. 1 is a diagram showing an example of a battery apparatus according to an embodiment.

Referring to FIG. 1, a battery apparatus 100 has a structure that can be electrically connected to an external apparatus 10 through a positive link terminal DC(+) and a negative link terminal DC(−). In some embodiments, the battery apparatus 100 may be connected to the external apparatus 10 through the positive link terminal DC(+) and the negative link terminal DC(−). When the external apparatus 10 is a load, the battery apparatus 100 may be discharged by operating as a power supply that supplies power to the load. When the external apparatus 10 is a charger, the battery apparatus 100 may be charged by receiving external power through the charger 10. In some embodiments, the external apparatus 10 operating as the load may be, for example, an electronic device, a mobility apparatus, or an energy storage system (ESS). The mobility apparatus may be, for example, a vehicle such as an electric vehicle, a hybrid vehicle, or a smart mobility.

The battery apparatus 100 includes a plurality of battery packs 110, a plurality of switching circuits 120, a plurality of precharge control circuits 130, and a processor 140.

The battery packs 110 are connected in parallel to the link terminals DC(+) and DC(−) through the switching circuits 120. The switching circuits 120 corresponds to the battery packs 110, respectively. That is, each of the switching circuits 120 is connected to a corresponding battery pack included in the battery packs 110. Each of the battery packs 110 includes a plurality of battery cells (not shown), and has a positive terminal PV(+) and a negative terminal PV(−). In some embodiments, the battery cell may be a rechargeable battery. In some embodiments, a predetermined number of battery cells may be connected in series in the battery pack 110 to form a battery module for supplying desired power. In some embodiments, a predetermined number of battery modules may be connected in series or in parallel in the battery pack 110 to supply the desired power.

Each of the switching circuits 120 includes a positive switch 121, a negative switch 122, and a precharge circuit. In some embodiments, the precharge circuit may include a precharge switch 123, and a precharge resistor 124.

The positive switch 121 is connected between the positive terminal PV(+) of the corresponding battery pack 110 and the positive link terminal DC(+) of the battery apparatus. In some embodiments, the positive switch 121 and the precharge circuit may be connected in parallel between the positive terminal PV(+) of the corresponding battery pack 110 and the positive link terminal DC(+) of the battery apparatus. The negative switch 122 is connected between the negative terminal PV(−) of the corresponding battery pack 110 and the negative link terminal DC(−) of the battery apparatus. The switches 121 and 122 are controlled by the processor 140 to control electrical connection between the battery pack 110 and an external apparatus. In some embodiments, each of the switches 121 and 122 may include a contactor including a relay. In some embodiments, each of the switches 121 and 122 may include an electrical switch such as a transistor. In some embodiments, the switching circuit 120 may further include driving circuits (not shown) for driving the switches 121 and 122 respectively in response to control signals Cp1, Cp2, Cn1, and Cn2 from the processor 140. When the positive switch 121 and the negative switch 122 are closed, power may be supplied from the battery pack 110 to the external apparatus or may be supplied from the external apparatus to the battery pack 110. Closing of the switch may be expressed as on of the switch, and opening of the switch may be expressed as off of the switch.

The precharge switch 123 and the precharge resistor 124 may be connected in series between the positive terminal PV(+) of the corresponding battery pack 110 and the positive link terminal DC(+) of the battery apparatus. In an embodiment, a first terminal of the precharge switch 123 may be connected to the positive terminal PV(+) of the corresponding battery pack 110, a first terminal of the precharge resistor 124 may be connected to a second terminal of the precharge switch 123, and a second terminal of the precharge resistor 124 may be connected to the positive link terminal DC(+). In another embodiment, a first terminal of the precharge resistor 124 may be connected to the positive terminal PV(+) of the corresponding battery pack 110, a first terminal of the precharge switch 123 may be connected to a second terminal of the precharge resistor 124, and a second terminal of the precharge switch 123 may be connected to the positive link terminal DC(+). In some embodiments, the precharge switch 123 may include a contactor including a relay. In some embodiments, the precharge switch 123 may include an electrical switch such as a transistor. In some embodiments, the switching circuit 120 may further include a driving circuit (not shown) for driving the precharge switch 123 in response to control signals Cpc1' and Cpc2' from the precharge control circuit 130. When the precharge switch 123 and the negative switch 122 are closed, a current is supplied from the battery pack 110 to a capacitor 11 of the external apparatus 10 through the precharge resistor 124 to precharge the capacitor 11. Although FIG. 1 shows the precharge circuit including the precharge switch 123 and the precharge resistor 124 connected in series, other precharge circuits capable of precharging the capacitor 11 in response to the control signals from the precharge control circuit 130 may be used.

The precharge control circuits 130 correspond to the switching circuits 120, respectively. That is, each of the precharge control circuits 130 is connected to a corresponding switching circuit 120 among the switching circuits 120. In some embodiments, the precharge control circuit 130 may control an operation of the corresponding precharge switch 123 based on a difference between a voltage of a corresponding battery pack 110 and a voltage of the capacitor 11. The precharge control circuit 130 operates in response to the control signals Cpc1 and Cpc2 for closing the precharge switch 123 of the corresponding switching circuit 120 from the processor 140. Upon receiving the control signals Cpc1 and Cpc2 for closing the precharge switch 123, the precharge control circuit 130 may close the precharge switch 123 when the voltage of the capacitor 11 is lower than the voltage of the corresponding battery pack 110, and may not close the precharge switch 123 when the voltage of the capacitor 11 is equal to or similar to the voltage of the corresponding battery pack 110. For example, when the difference between the voltage of the battery pack 110 and the voltage of the capacitor 11 is less than or equal to a predetermined voltage (first predetermined voltage), it may be determined that the voltage of the capacitor 11 is equal to or similar to the voltage of the battery pack 110. In some embodiments, the predetermined voltage may be 0V.

The processor 140 controls operations of the switching circuits 120 and the precharge control circuits 130. The processor 140 may include, for example, a micro controller unit (MCU). In some embodiments, the processor 140 may select a battery pack 110 to first supply power based on voltages of the battery packs 110. Accordingly, the processor 140 may drive the switching circuit 120 corresponding to the selected battery pack 110.

In some embodiments, the processor 140 may supply the power through the battery pack 110 by controlling the switching circuit 120 connected to the battery pack 110 having the highest voltage among the battery packs 110. Next, when the voltage of the corresponding battery pack 110 becomes similar to the voltages of the other battery packs 110, the processor 140 may control the switching circuit 120 connected to the other battery packs 110 to supply the power through at least two battery packs 110 that are connected in parallel. Upon supplying the power simultaneously through two battery packs 110, if a voltage difference between the two battery packs 110 is greater than a predetermined voltage (second predetermined voltage), an inrush current may flow from the battery pack 110 with a high voltage to the battery pack 110 with a low voltage. Accordingly, the generation of the inrush current can be prevented by first supplying the power through the battery pack 110 having the high voltage, and then supplying the power through the other battery pack 110 when the voltages of the two battery packs become similar. In some embodiments, a case where the voltages of the two battery packs 110 become similar may mean a case where a voltage difference between the two battery packs 110 becomes less than or equal to a predetermined voltage. In some embodiments, the predetermined voltage may be experimentally determined as the voltage difference at which the inrush current does not occur or the inrush current that does not affect the circuit occurs.

In some embodiments, the battery apparatus 100 may further include a voltage sensing circuit (not shown) for sensing the voltages of the battery packs 110 and/or the voltage of the capacitor 11.

In some embodiments, the switching circuit 120, the precharge control circuit 130, and/or the processor 140 may be included in a battery management system (BMS) of the battery apparatus.

As described above, in some embodiments, the precharge control circuit 130 may receive the first control signal Cpc1 from the processor 140, close the precharge switch 123 in response to the first control signal Cpc1 when the voltage difference between the battery pack 110 and the capacitor 11 is greater than the predetermined voltage, and may not close the precharge switch 123 when the voltage difference between the battery pack 110 and the capacitor 11 is less than or equal to the predetermined voltage.

Figure 2:
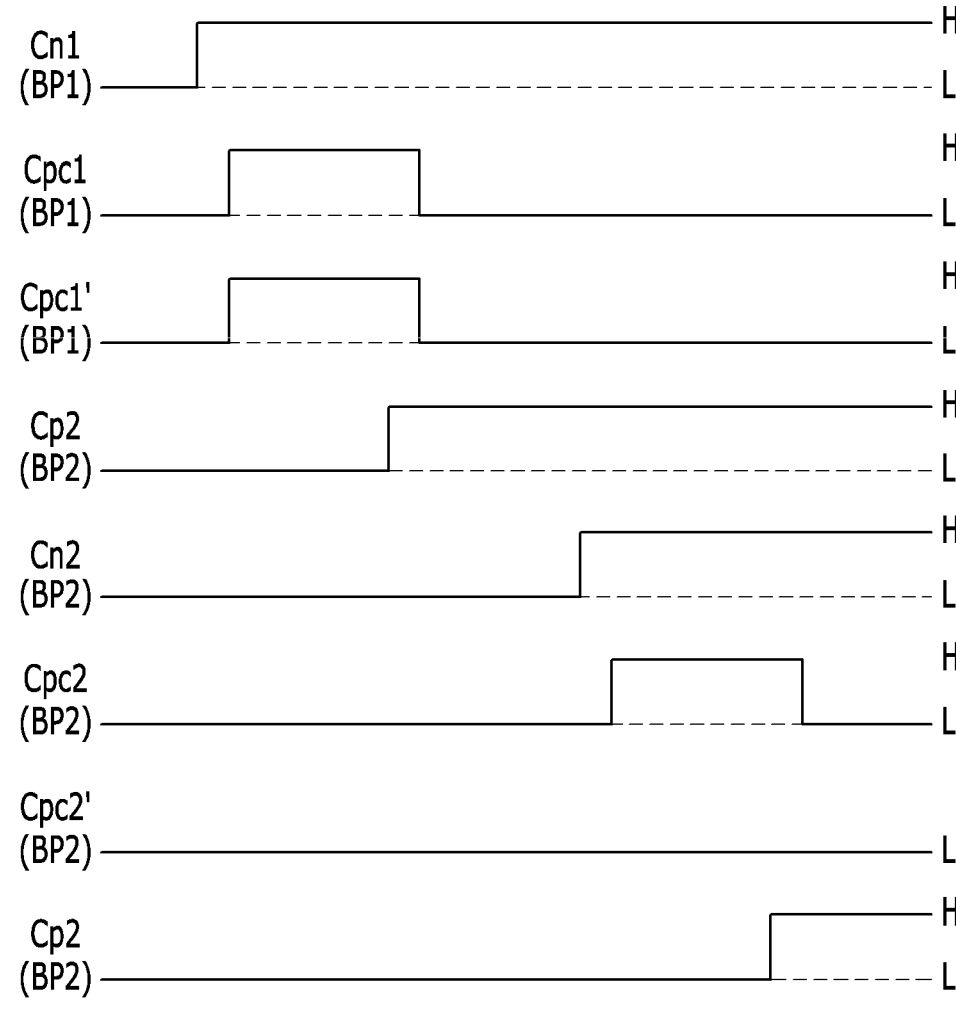
FIG. 2 is a drawing showing an example of timings of control signals of a battery apparatus according to an embodiment.

FIG. 2 is a drawing showing an example of timings of control signals of a battery apparatus according to an embodiment. For convenience, two battery packs BP1 and BP2 are used as an example in FIG. 2.

Referring to FIG. 1 and FIG. 2, when a battery apparatus is initially driven, a processor 140 first supplies power through a battery pack (e.g., BP1) having a high voltage among a plurality of battery packs BP1 and BP2. To this end, the processor 140 first outputs a control signal Cn1 for closing a negative switch 122 of a switching circuit connected to the battery pack BP1. That is, the processor 140 switches the control signal Cn1 from a disable level to an enable level. In some embodiments, the enable level may be a high level H and the disable level may be a low level L.

Next, the processor 140 outputs a control signal Cpc1 for closing a precharge switch (e.g., 123 in FIG. 1) connected to the battery pack BP1 while the negative switch 122 is closed. That is, the processor 140 switches the control signal Cpc1 from the disable level to the enable level. The precharge control circuit 130 outputs a control signal Cpc1' having the enable level in response to the control signal Cpc1. When the precharge switch 123 is closed in response to the control signal Cpc1', a precharge current is supplied from the battery pack BP1 to a capacitor 11 of an external apparatus through a precharge resistor 124 so that the capacitor 11 can be precharged. On the other hand, when the capacitor 11 has been already charged to a voltage of battery pack BP1, the precharge control circuit 130 outputs the control signal Cpc1' having the disable level regardless of the enable level of the control signal Cpc1 so that the precharge switch 123 may be not closed. Further, when the precharge switch 123 is closed and then the capacitor 11 is precharged to the voltage of the battery pack BP1, even before the control signal Cpc1 changes to the disable level, the precharge control circuit 130 switches the control signal Cpc1' to the disable level so that the precharge switch 123 may be opened.

After precharging the capacitor 11, the processor 140 outputs the control signal Cp1 for closing a positive switch 121 connected to the battery pack BP1 to supply power through the battery pack BP1. That is, the processor 140 switches the control signal Cp1 from the disable level to the enable level. In this case, since the precharge is completed, the processor 140 may switch the control signal Cpc1 to the disable level to open the precharge switch 123.

Next, when the voltage of the battery pack BP1 is lowered to be similar to the voltage of the battery pack BP2, the processor 140 also supplies the power through the battery pack BP2. That is, the power may be supplied through the battery packs BP1 and BP2. To this end, the processor 140 first outputs a control signal Cn2 for closing a negative switch 122 of a switching circuit connected to the battery pack BP2. That is, the processor 140 converts the control signal Cn2 from the disable level to the enable level. Next, the processor 140 outputs the control signal Cpc2 for closing a precharge switch 123 connected to the battery pack BP2 while the negative switch 122 is closed. That is, the processor 140 switches the control signal Cpc2 from the disable level to the enable level. In this case, since the capacitor 11 has been already charged to the voltage of battery pack BP2 through the power supplied from the battery pack BP1, a precharge control circuit 123 connected to the battery pack BP2 may output the control signal Cpc2' having the enable level regardless of the enable level of the control signal Cpc2. Accordingly, the precharge switch 123 connected to the battery pack BP2 may be not closed. On the other hand, when the voltage charged to the capacitor 11 is lower than the voltage of the battery pack BP2 due to the discharge of the capacitor 11, the precharge control circuit 123 outputs the control signal Cpc2' having the enable level, and the precharge switch 123 is closed so that the capacitor 11 can be precharged.

Next, the processor 140 outputs the control signal Cp2 for closing a positive switch 121 connected to the battery pack BP2 in order to supply the power through the battery pack BP2. That is, the processor 140 switches the control signal Cp2 from the disable level to the enable level. In this case, the processor 140 may switch the control signal Cpc2 for the precharge to the disable level.

As described above, in some embodiments, the first precharge control circuit 130 may control the first precharge switch 123 based on the voltage difference between the first battery pack BP1 and the capacitor 11. The second precharge control circuit 130 may control the second precharge switch 123 based on the voltage difference between the second battery pack BP2 and the capacitor 11. The processor 140 may transfer the first control signal Cpc1 for controlling the first precharge switch 123 to the first precharge control circuit 130, and transfer the second control signal Cpc2 for controlling the second precharge switch 123 to the second precharge control circuit 130.

In some embodiments, upon receiving the first control signal Cpc1 having the enable level from the processor 140, the first precharge control circuit 130 may close the first precharge switch 123 when the voltage difference between the first battery pack BP1 and the capacitor 11 is greater than a predetermined voltage.

In some embodiments, upon receiving the first control signal Cpc1 having the enable level from the processor 140, the first precharge control circuit 130 may not close the precharge switch 123 when the voltage difference between the voltage first battery pack BP1 and the capacitor 11 is less than or equal to the predetermined voltage.

As described above, according to various embodiments, when a sufficient voltage is charged in the capacitor 11 and thus the precharge is unnecessary, the precharge is not performed regardless of the control signal so that the unnecessary precharge process can be omitted. Accordingly, a cycle-life of the precharge circuit can be extended.

Figure 3:
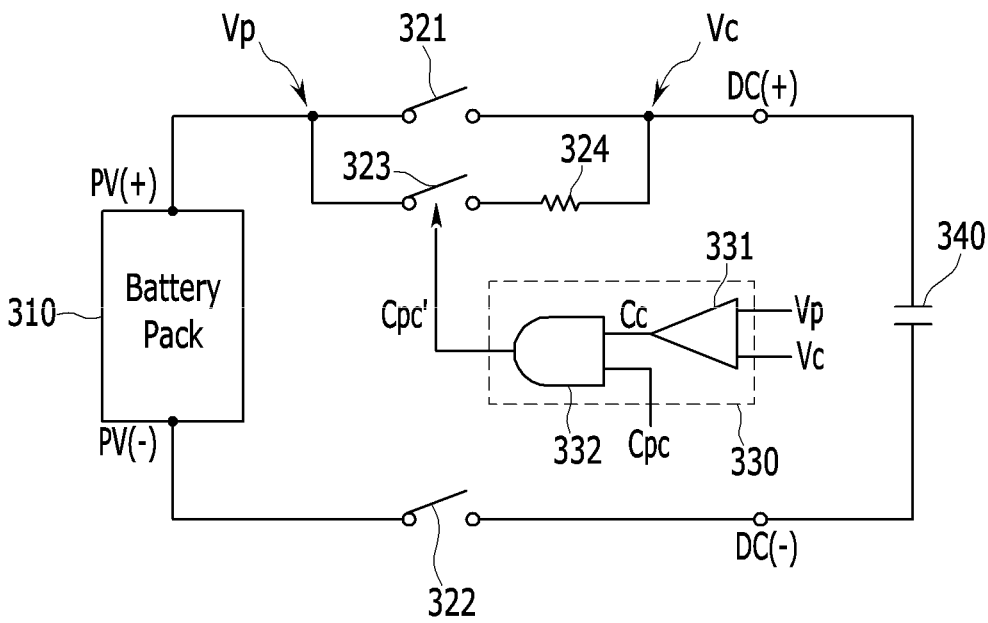
FIG. 3 and FIG. 4 each are a drawing showing an example of a precharge control circuit in a battery apparatus according to an embodiment.
Figure 4:
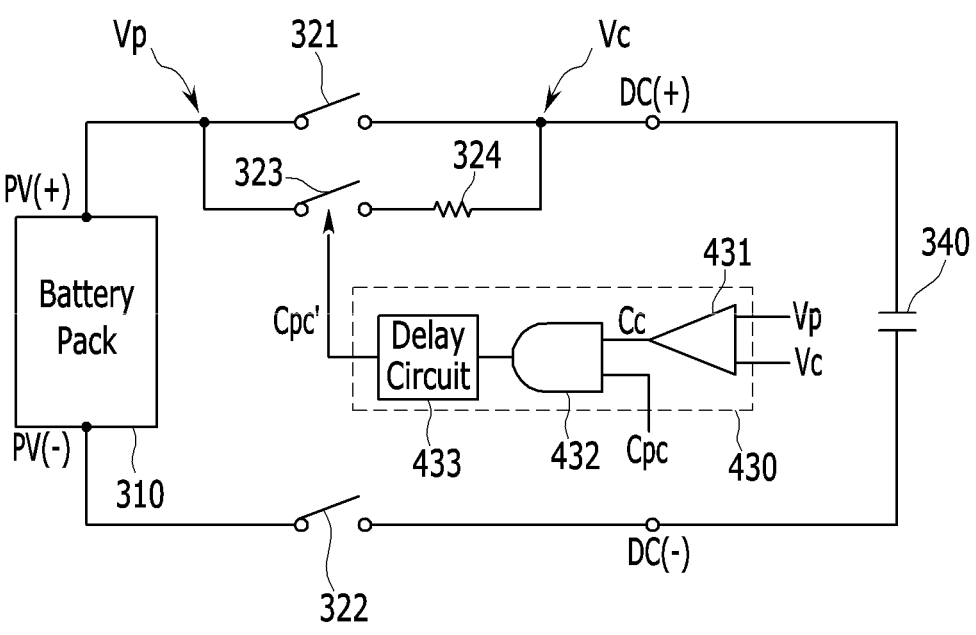

FIG. 3 and FIG. 4 each are a drawing showing an example of a precharge control circuit in a battery apparatus according to an embodiment. For convenience, a precharge control circuit connected to one battery pack is shown in FIG. 3 and FIG. 4.

Referring to FIG. 3, a precharge control circuit 330 includes a comparator 331 and a logic circuit 332. Because a battery pack 310, a positive switch 321, a negative switch 322, a precharge switch 323, and a precharge resistor 324 shown in FIG. 3 are similar to a battery pack 110, a positive switch 121, a negative switch 122, a precharge switch 123, and a precharge resistor 124 described with reference to FIG. 1, a description thereof is omitted.

The comparator 331 receives a voltage Vp of the battery pack 310 and a voltage Vc of a capacitor 340 of an external apparatus. In some embodiments, a voltage sensing circuit (not shown) may measure the voltage Vp of the battery pack 310 by sensing a voltage at a contact between the battery pack 310 and the positive switch 321 or the precharge switch 323. In some embodiments, the voltage sensing circuit may measure the voltage Vc of the capacitor 340 by sensing a voltage at a contact between a positive link terminal DC(+) and the positive switch 321 or the precharge resistor 324.

The comparator 331 compares the voltage Vp of the battery pack 310 with the voltage Vc of the capacitor 340, and outputs an output signal according to a comparison result, i.e., a control signal Cc. In some embodiments, the comparator 331 may output the control signal Cc having an enable level when a difference between the voltage Vp of the battery pack 310 and the voltage Vc of the capacitor 340 of the external apparatus is less than or equal to a threshold voltage. In an embodiment, the comparator 331 may output the control signal Cc having the enable level when the voltage Vp of the battery pack 310 is equal to the voltage Vc of the capacitor 340 (i.e., the threshold voltage is 0V). In some embodiments, the comparator 331 may output the control signal Cc having the disable level when the voltage Vp of the battery pack 310 is higher than the voltage Vc of the capacitor 340 and the difference is greater than the threshold voltage. In an embodiment, the comparator 331 may output the control signal Cc having the disable level when the voltage Vp of the battery pack 310 is higher than the voltage Vc of the capacitor 340 (i.e., the threshold voltage is 0V).

The logic circuit 332 receives the control signal Cc output from the comparator 331 and a control signal Cpc for controlling the precharge switch 323 output from a processor (e.g., 140 in FIG. 1). The logic circuit 332 perform a logical operation on the control signal Cc and the control signal Cpc to output a control signal Cpc'. In some embodiments, the logic circuit 332 may output the control signal Cpc' having the enable level when both the control signals Cc and Cpc have the enable level so that the precharge switch 323 can be closed. In some embodiments, the logic circuit 332 may output the control signal Cpc' having the disable level when at least one of the two control signals Cc and Cpc have the disable level so that the precharge switch 323 can be opened. In some embodiments, when the enable level is a high level, the logic circuit 332 may include an AND gate.

As such, when a sufficient voltage is charged to the capacitor 340 in the precharge control circuit 330 and thus the precharge is unnecessary, the precharge switch may be not closed regardless of the control signal. Accordingly, it is possible to extend a cycle-life of the precharge circuit by omitting the unnecessary precharge process.

Referring to FIG. 4, a precharge control circuit 430 includes a comparator 431, a logic circuit 432, and a delay circuit 433.

The comparator 431 receives a voltage Vp of a battery pack 310 and a voltage Vc of a capacitor 340 of an external apparatus, and outputs a control signal Cc according to a comparison result. The logic circuit 432 receives a control signal Cc output from the comparator 431 and a control signal Cpc for controlling a precharge switch 323 output from the processor (e.g., 140 in FIG. 1), and performs a logical operation on the control signal Cc and the control signal Cpc to output a control signal Cpc'. Because the comparator 431 and the logic circuit 432 performs operations similar as those of the comparator 331 and the logic circuit 332 described with reference to FIG. 3, a detailed description thereof is omitted.

The delay circuit 433 receives a control signal output from the logic circuit 432, delays the control signal by a predetermined time, and then outputs the control signal Cpc'. The precharge switch 323 may be closed in response to an enable level of the control signal Cpc'.

In this way, by delaying the control signal by the delay circuit 433, it is possible to prevent the negative switch 322 and the precharge switch 323 from being closed simultaneously when the precharge switch 323 is closed.

Figure 5:
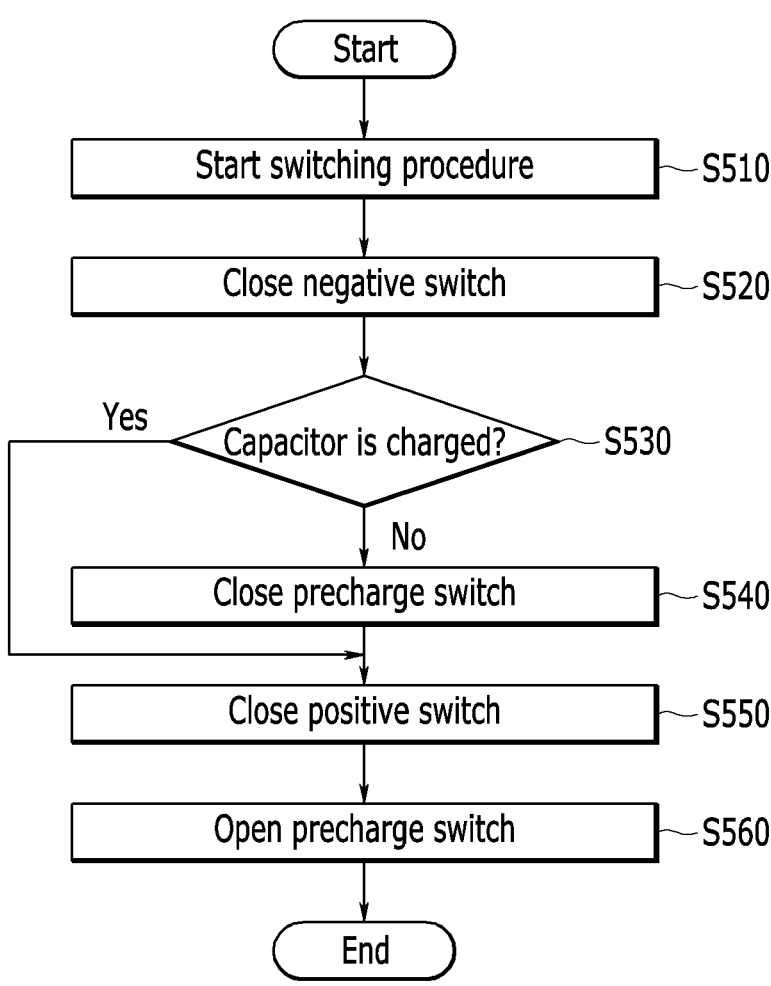
FIG. 5 is a flowchart showing an example of a precharge control method according to an embodiment.

FIG. 5 is a flowchart showing an example of a precharge control method according to an embodiment.

Referring to FIG. 5, a battery management system of a battery apparatus starts a switching procedure to supply power through a battery pack at S510. The battery management system first closes a negative switch (e.g., 122 in FIG. 1) at S520. In some embodiments, the battery management system may transfer a control signal having an enable level to the negative switch 122 to close the negative switch 122 at S520.

The battery management system then determines whether a capacitor (e.g., 11 in FIG. 1) of an external device has been sufficiently charged at S530. In some embodiments, the battery management system may decide whether to precharge the capacitor 11 based on a voltage difference between the battery pack and the capacitor 11 at S530. If the capacitor 11 has been sufficiently charged, the battery management system may decide not to precharge the capacitor 11. In this case, the battery management system maintains a precharge switch (e.g., 123 in FIG. 1) in an open state, and closes a positive switch (e.g., 121 in FIG. 1) at S550. Meanwhile, if the capacitor 11 has not been sufficiently charged, the battery management system decides to precharge the capacitor 11, and closes the precharge switch 123 at S540. In some embodiments, the battery management system may determine whether the capacitor 11 has been sufficiently charged by comparing a voltage charged in the capacitor 11 with a voltage of the battery pack for supplying power at S530. In some embodiments, the battery management system may transfer a control signal having the enable level to the precharge switch 123 to close the precharge switch 123 at S540. In some embodiments, the battery management system may transfer a control signal having the enable level to the positive switch 121 to close the positive switch 121 at S550.

After closing the positive switch 121, the battery management system opens the precharge switch 123 at S560. In some embodiments, the battery management system may transfer a control signal having the disable level to the precharge switch 123 to open the precharge switch 123 at S560.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. A battery apparatus comprising
   a first battery pack and a second battery pack connected in parallel;

a first precharge switch connected between a terminal of the first battery pack and a capacitor of an external apparatus;

a second precharge switch connected between a terminal of the second battery pack and the capacitor of the external apparatus;

a first precharge control circuit configured to control an operation of the first precharge switch based on a difference between a voltage of the first battery pack and a voltage of the capacitor of the external apparatus;

a second precharge control circuit configured to control an operation of the second precharge switch based on a difference between a voltage of the second battery pack and the voltage of the capacitor of the external apparatus; and a processor configured to send a first control signal for controlling the first precharge switch to the first precharge control circuit, send a second control signal for controlling the second precharge switch to the second precharge control circuit, and omit activation of the first precharge control circuit in response to determining that a difference between the voltage of the first battery pack and the voltage of the capacitor is less than or equal to a predetermined voltage or omit activation of the second precharge control circuit in response to determining that a difference between the voltage of the second battery pack and the voltage of the capacitor is less than or equal to the predetermined voltage.

2. The battery apparatus of claim 1, wherein the first precharge control circuit is configured to close the first precharge switch in response to receiving the first control signal having an enable level from the processor and the difference between the voltage of the first battery pack and the voltage of the capacitor being greater than the predetermined voltage.

3. The battery apparatus of claim 2, wherein the first precharge control circuit is configured to maintain an open state of the first precharge switch in response to receiving the first control signal having an enable level from the processors and the difference between the voltage of the first battery pack and the voltage of the capacitor being less than or equal to the predetermined voltage.

4. The battery apparatus of claim 2, wherein the predetermined voltage is 0V.

5. The battery apparatus of claim 1, wherein the first precharge control circuit comprises:

a comparator configured to compare the voltage of the first battery pack with the voltage of the capacitor of the external apparatus; and a logic circuit configured to perform a logical operation to output a third control signal according to a comparison result of the comparator and the first control signal, and wherein the first precharge control circuit is configured to control the first precharge switch based on the third control signal.

6. The battery apparatus of claim 1, wherein the first precharge control circuit comprises:

a comparator configured to compare the voltage of the first battery pack with the voltage of the capacitor of the external apparatus;

a logic circuit configured to perform a logical operation to output a third control signal according to a comparison result of the comparator and the first control signal; and a delay circuit configured to output a fourth control signal by delaying the third control signal, and wherein the first precharge control circuit is configured to control the first precharge switch based on the fourth control signal.

7. The battery apparatus of claim 1, wherein in when the voltage of the second battery pack is higher than the voltage of the first battery pack, the processor is configured to:

output the second control signal having an enable level; and output the first control signal having the enable level when a difference between the voltage of the second battery pack and the voltage of the first battery pack is less than or equal to a predetermined voltage.

8. The battery apparatus of claim 1, further comprising:

a first precharge resistor through which a first current flows from the first battery pack to the capacitor of the external apparatus when the first precharge switch is closed; and a second precharge resistor through which a second current flows from the second battery pack to the capacitor of the external apparatus when the second precharge switch is closed.

9. A battery management system of a battery apparatus including a battery pack, the battery management system comprising:

a precharge switch connected between a terminal of the battery pack and a capacitor of an external apparatus;

a processor configured to output a first control signal for controlling the precharge switch; and a precharge control circuit configured to:

receive the first control signal, omit an activation of the precharge switch when the difference between the voltage of the battery pack and the voltage of the capacitor is less than or equal to the predetermined voltage.

10. The battery management system of claim 9, wherein the precharge control circuit comprises:

a comparator configured to compare the voltage of the battery pack with the voltage of the capacitor of the external apparatus; and a logic circuit configured to perform a logical operation to output a second control signal based on a comparison result of the comparator and the first control signal; and wherein the precharge control circuit is configured to control the precharge switch based on the second control signal.

11. The battery management system of claim 9, wherein the precharge control circuit comprises:

a comparator configured to compare the voltage of the battery pack and the voltage of the capacitor;

a logic circuit configured to perform a logical operation to output a second control signal based on a comparison result of the comparator and the first control signal; and a delay circuit configured to output a third control signal by delaying the second control signal, and wherein the precharge control circuit is configured to control the precharge switch based on the second control signal.

12. The battery management system of claim 9, further comprising a precharge resistor through which a current flows from the battery pack to the capacitor of the external apparatus when the precharge switch is closed.

13. A method of precharging a capacitor of an external apparatus connected to a battery apparatus including a battery pack, the method comprising:

closing a negative switch of the battery pack;

precharging the capacitor of the external apparatus based on a difference between a voltage of the battery pack and a voltage of the capacitor of the external apparatus;

omitting an activation of a precharge switch when the precharging the capacitor of the external apparatus is not necessary; and closing a positive switch of the battery pack.

14. The method of claim 13, further comprising precharging the capacitor of the external apparatus when the difference between the voltage of the battery pack and the voltage of the capacitor of the external apparatus is less than or equal to a predetermined voltage.

15. The method of claim 13, further comprising not precharging the capacitor of the external apparatus when the difference between the voltage of the battery pack and the voltage of the capacitor of the external apparatus is greater than a predetermined voltage.

\*  \*  \*  \*  \*